United States Patent
Liu

(10) Patent No.: US 10,480,457 B2
(45) Date of Patent: Nov. 19, 2019

(54) TWO-STROKE RECIPROCATING PISTON COMBUSTION ENGINE

(71) Applicant: Gang Liu, Zhejiang (CN)

(72) Inventor: Gang Liu, Zhejiang (CN)

(*) Notice: Subject to any disclaimer, the term of this patent is extended or adjusted under 35 U.S.C. 154(b) by 0 days.

(21) Appl. No.: 14/159,038

(22) Filed: Jan. 20, 2014

(65) Prior Publication Data

US 2014/0130770 A1 May 15, 2014

(51) Int. Cl.
| | |
|---|---|
| *F02M 1/00* | (2006.01) |
| *F02M 25/03* | (2006.01) |
| *F02B 33/22* | (2006.01) |
| F02B 3/06 | (2006.01) |
| F02M 25/022 | (2006.01) |
| F02B 47/02 | (2006.01) |

(52) U.S. Cl.
CPC ............ *F02M 25/03* (2013.01); *F02B 33/22* (2013.01); *F02B 3/06* (2013.01); *F02B 47/02* (2013.01); *F02M 1/00* (2013.01); *F02M 25/022* (2013.01); *F02M 2700/4321* (2013.01); *Y02T 10/121* (2013.01)

(58) Field of Classification Search
CPC ............ F02M 1/00; F02M 2700/4321; F02M 25/022; F02B 47/02; F02B 3/06
USPC .................................................. 123/25 A
See application file for complete search history.

(56) References Cited

U.S. PATENT DOCUMENTS

| | | | | |
|---|---|---|---|---|
| 2,041,160 A | * | 5/1936 | Zahodiakin | F01L 3/16 |
| | | | | 123/41.17 |
| 7,958,872 B1 | * | 6/2011 | Schechter | 123/568.11 |

* cited by examiner

*Primary Examiner* — Jacob Amick
*Assistant Examiner* — Charles Brauch

(57) ABSTRACT

A two-stroke reciprocating piston engine. The engine principally consists of an expansion cylinder and a compression cylinder, and an expansion chamber and a combustion chamber. When pistons of the expansion cylinder and compression cylinder move from a bottom dead center to a top dead center, gas in the expansion cylinder is compressed in the expansion chamber, gas in the compression cylinder is compressed in the combustion chamber, a water spray nozzle sprays water towards the high temperature and high pressure gas in the expansion chamber, and when the water encounters the high temperature and high pressure gas, the water is rapidly vaporized. At the same time, an oil spray nozzle sprays a fuel into the combustion chamber, a spark from a spark plug ignites the combustible gas of the combustion chamber, the high temperature and high pressure gas produced by the combustion pushes open a valve of the combustion chamber.

1 Claim, 1 Drawing Sheet

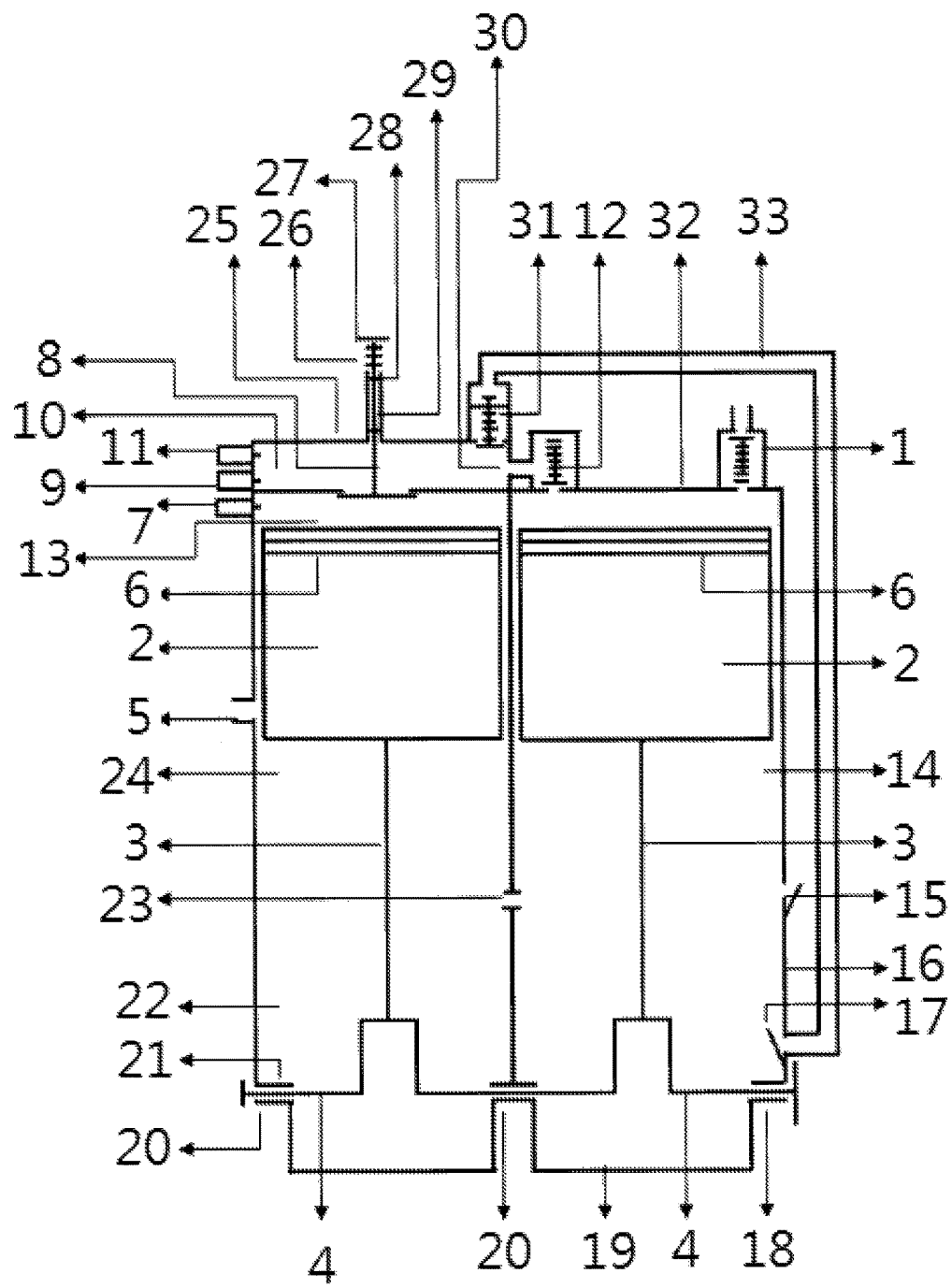

TWO-STROKE RECIPROCATING PISTON COMBUSTION ENGINE

FIELD OF THE INVENTION

Present invention relates to an internal combustion piston engine, especially a two-stroke reciprocating piston combustion engine.

BACKGROUND OF THE INVENTION

Known reciprocating internal combustion piston engines generally comprise the follow structural characteristics: 1. A crank connecting rods structure, which comprises a engine body, pistons, connecting rod, and a crankshaft flywheel; 2. Valve structure, which comprises intake and exhaust valves and camshafts; 3. Fuel supply structure, which comprises a fuel tank, fuel pumps, and a carburetor (or a fuel nozzle); 4. Lubrication system, which comprises lubricating channel, oil pump, filter, and oil valve; 5. Cooling system which comprises a water tank, thermostat, water pump, cooling fan, and water sleeve; 7. Ignition system, which comprises a battery, electricity generator, distributor, ignition coil, and spark plug; 7 starting system, which comprises a starter motor. In accordance with the number of strokes required to complete a stroke loop, the reciprocating internal combustion piston engine can be categorized into four-stroke and two-stroke engine. The stroking loop for a four-stroke piston engine is: intake stroke—pistons move from the top most point to the lowest point, which suck in combustible gas (or air) into cylinders; compression stroke—pistons move from the lowest point to the top most point, which compress combustible gas (or air); power stroke—pistons move from the top most point to the lowest point, this is triggered by when pistons move to the top most point, spark plugs ignite (or fuel nozzle spray fuel into the cylinder, the compressed combustible gas burns in the combustion chamber, the high temperature and high pressure air expands in the chamber, which pushes the pistons from top to down; and exhaust stroke—pistons move from the lowest point to the top most point, which release the exhaust gas from burning the fuel out from the cylinder. The stroking loop for a two-stroke piston engine (gasoline engine) is: first stroke—pistons move from lowest point to the top most point, when the pistons are moving up, ventilation vent and exhaust vent close; when the ventilation vent and exhaust vent are closing, the mixed air and fuel that is already in the cylinder is compressed until the pistons are move to the top most point. In addition, when the pistons are moving upward, the volume of the crankcase increasing and creating a vacuum effect and when the pistons moves to the intake vent, the pistons are pull back into the crankcase. Second stroke—pistons move from top most point to the lowest point, this is triggered by when pistons move to the top most point, spark plugs ignite (or fuel nozzle spray fuel into the cylinder, the compressed combustible gas burns in the combustion chamber, the high temperature and high pressure air expands in the chamber, which pushes the pistons from top to down, and at the same time, turn the crankshaft to generate output force. In addition, when the pistons are moving downward, the mixed air and fuel in the crankcase is compressed, when the pistons move to the lowest point, the exhaust vent is open, the exhaust air from burning the fuel is release out from the cylinder by pressure, then the ventilation vent opens allowing the mixed air and fuel in the crankcase into the cylinder.

Whether it is a four-stroke internal combustion engine or a two-stroke internal combustion engine, they all based on the combustion of gasoline, diesel fuel and other combustible materials that can be mixed with air to form flammable compressed air that when burning, generates high temperature and high pressure air that expands in the cylinder, and pushes pistons from top most point to the lowest point to reach to generate force. However, one of biggest problem with this working principle is that: the high temperature and high pressured air generate from burning the mixed gas burning to generate expanding force in the valve is immediately released from the valve, as such the efficient use of heat energy is low and at the same time, pollutes the environment. In addition, the four-stroke internal combustion engine requires four strokes to complete a stroking loop, this require more complex gas distribution structure and a water cooling system, as such further increase the heat loss. On the other hand, although a two-stroke internal combustion engine has a simpler stroking loop requirement and structural characteristics, and the heat loss during the stroking loop is less than the four-stroke engine, however, because limited by the structural characteristics, the heat energy use efficiency may not be as better than a four-stroke engine. And finally, during the power stroke, the temperature in the cylinders may reach 2000 F to 2500 F, such high temperature may lead to fast wear of the engine components and greatly reduce the life of an engine. And production costs to manufacturer engine components that could withstand the high temperature are generally high.

In order to effectively use the heat energy and increase the efficiency of internal combustion engine, many improvement methods have been introduced. One method is to spray water into the cylinders. The principle of the water spraying method is that, when the engine is running, the high temperature inside the cylinders expands the water vapor and produces pressure that help to push the pistons. Typically, there are two types of water spray methods: first method is when the engine is running and when the pistons are moving from top most point to the lowest point, appropriate amount of water is sprayed into the cylinders. The high temperature inside the cylinders then immediately vaporize the water and the water vapor is expanded to produce added pressure that help to optimize engine work and discharge of exhaust gas. The second method is when pistons are completing the power stroke; where when pistons are moving from lowest point to the top most point to compress the remaining exhaust gas; when the pistons are moving close to the top most point, appropriate amount of water is then sprayed into the cylinders, and then the high temperature vaporizes the water and the water vapor is expanded to produce additional force to push the pistons downward to initiate a second power stroke.

The two water spray methods described above has some similarities and differences. One similarity is that both methods require a direct spray of water into cylinders and then the high temperature in the cylinder vaporize the water to increase engine work efficiency. One difference between the two methods is that in the first method, the water spray timing is selected at when pistons are completing the power stroke, and use the high temperature in the cylinder to vaporize the water to produce vapor pressure to provide auxiliary boost effect. And in the second method the water is sprayed when the pistons have completed the power stroke and are proceeding to and after the compression stroke. The second method uses the heat from cylinder, pistons, and gas to vaporize the water and produce vapor pressure to push the pistons to initiate a second stroking loop.

The above two water spray methods because of different water spray timing, there are shortcomings unique to each method. In the first method, because water is sprayed when the pistons are moving from lowest point to the top most point, only a small amount of water can be sprayed, otherwise it will impact normal working of the engine, as such the heat energy use is limited. In addition, because the water is sprayed during the stroking loop, therefore, when the engine is cold or during the high speed running, the first water spray may not have effective result. On the other hand, the second water spray method sprays water when the pistons have completed the power stroke, however, during this time, most of heat generated from burning the combustible gas have already released out from the cylinders, therefore, the water sprayed into the cylinder may not be fully turned into vapor pressure, as a result damaging the engine components. In addition, there is a greater temperature difference inside the cylinders and may reduce the life of the engine.

SUMMARY OF THE INVENTION

In the current reciprocating internal combustion piston engines, whether with water spray, turbo charge or direct fuel injection technology, because limited by the working methods and structural restriction, they could not provide an optimal solution to the efficient use of combustible gas, and there is also the problem of premature wear of the engine components and high production cost of heat resistance engine components. It then, can be said that the development of reciprocating internal combustion engine is slow and unsatisfactory to the modern standard. In order to overcome the above shortcoming of direct burning and direct release of exhaust gas, to optimize the effective and efficient use of heat energy, to tackle the high production cost of manufacturing heat resistant engine components and to simplify the engine structure for smaller engine body, the present invention provides a new type of two-stroke internal combustion piston engine and its work method that would completely change the structural characteristics of typical two-stroke internal combustion piston engines and its working method. Present invention will allow more effective and efficient use of the heat energy generated from burning the combustible gas, and is friendlier to the environment. Present invention further provides a one valve and multiple pistons design that allows for a smaller engine structure but with greater power output than the conventional internal combustion piston engines.

To attain these objectives, present invention of a two-stroke reciprocating piston gasoline engine has the following structural characteristics:

A. main components include: cylinder head for compression cylinders mainly comprises of an intake valve and a exhaust valve, where the valve further comprises of valve and springs; pistons for compression cylinder and expansion cylinders mainly comprises of seal ring groove, seal ring, piston pins, piston pin bores, wherein, the seal ring is installed in the seal ring groove, and piston pins are installed in the piston pin bores; connecting rod, mainly comprises of a rod body, a small connecting rod header and a large connecting rod header; crankshaft mainly comprises of a crankshaft main axle neck, connecting rod axle neck, and crankshaft arm; cylinder head for expansion cylinder, mainly comprises of expansion chamber, combustion chamber, valve, valve sleeve, valve returning spring and intake-exhaust valve, wherein, the internal shape of the expansion chamber and combustion chamber is cylindrical and are interconnected with each other and is designed in the same axis line; the diameter of the mouth of expansion chamber is greater than the diameter of the mouth of the combustion chamber; valve is mainly comprises of valve pole, valve pole straight seal ring groove, valve pole seal ring, and valve nuts, wherein, valve pole seal ring is installed in the valve pole seal ring groove, valve pole is installed in the valve sleeve of the cylinder head, valve returning spring is installed on the valve sleeve, valve nuts is screwed in the screw head of valve pole; the valve controls the opening and closing of the combustion chamber. Spray nozzle is provided on the side of the expansion chamber and spark plugs and fuel nozzle are installed on the side or top of the combustion chamber. A primary intake passage, mainly comprises of an intake-exhaust valve, wherein the intake-exhaust valve comprises of valve, spring, valve sleeve and nuts, wherein, the springs is installed on the valve pole, and the valve pole is inserted into the valve sleeve, the valve sleeve is supported by a bracket in the channel of the valve, nuts are screwed in the screw head of the valve pole; an engine body, mainly comprises of compression cylinder, expansion cylinder, crankcase, crankshaft, crankshaft main axle neck seat, wherein, an exhaust vent is provided under the expansion cylinder; the crankcase is provided with a combustion chamber intake-exhaust valve, a crankcase exhaust valve and an opening; a crankcase cover, mainly comprises of a shell and a crankshaft main axle neck seat.

B. Engine structural characteristics: the above described pistons are installed in the compression cylinder and expansion cylinders of the engine body. The piston pin is connected with the small header of the connecting rod, the large connecting rod header is connected with the connecting rod axle neck of the crankshaft. The crankcase cover is connected with the crankcase of engine body by the crankcase nuts; crankshaft is installed in the crankshaft main axle neck seat of the crank case and the crankshaft main axle neck seat of the crankcase cover; the cylinder head of the expansion cylinder are screwed onto the expansion cylinder, and the cylinder head of the compression cylinder are screwed onto the compression cylinder. A pipe line interconnects the intake-exhaust valve of the combustion chamber and the intake-exhaust valve of the crankcase; the exhaust valve of the compression cylinder is interconnected with the primary intake passage of the combustion chamber of the expansion cylinder.

C. stroking method: when the pistons in the compression cylinder and expansion cylinder are moving from the lowest point to the top most point, the generated gas pressure closes the valve of combustion chamber and the intake valve of the compression cylinder, when the gas pressure inside the compression cylinder is smaller than the spring pressure of the exhaust valve, the gas is retained in the cylinder, and at the same time, because pistons in the compression cylinder and expansion cylinder move up, the space inside the crankcase increases and produces a suction force that closes the exhaust valve of the crankcase and opens the intake-exhaust valve, then the gas inside the combustion chamber is sucked through the intake-exhaust valve of the combustion chamber, the pipeline and the intake-exhaust valve of the crankcase into the crankcase, at the same time, the air outside the engine is also enter through the intake-exhaust valve of the crankcase into the crankcase. When the gas pressure inside the compression cylinder is larger than the spring pressure of the compression cylinder valve, the gas pressure opens the exhaust valve of the compression cylinder and the gas inside the compression cylinder then enters into the combustion chamber; because the gas pressure inside the combustion chamber increase, the intake-exhaust valve is closed and the gas inside the expansion cylinder is compressed in the expansion chamber of the expansion cylinder; when the pistons in the compression cylinder and expansion cylinder are moving to the top most point, the spray nozzle with the action of low pressure water pump and high pressure water pump, sprays appropriate amount of water into the expansion chamber to cool down the components of the expansion chamber from high temperature and high pressure gas. In addition, the sprayed water cause the high temperature and high pressure gas to quickly expand, and at the same time, the fuel nozzle with the action of low pressure fuel pump and high pressure pump, sprays appropriate amount of fuel (gasoline, diesel fuel, or natural gas) to mix with the air inside the combustion chamber. The spark plugs with the action of ignition system sparks and to ignite the combustible mixed air inside the combustion chamber, and the high temperature and high pressure air generate from the burning pushes open the valve of combustion chamber, and the gas inside the expansion chamber expands due to the high temperature and high pressure air inside the combustion chamber, and when the pistons in the expansion cylinder and compression cylinder have reached the top most point, the first stroking loop is completed; the pistons in the expansion cylinder under the force of high temperature and high pressure air move from the top most points to the lowest point, pistons through the connecting rod drive the crankshaft to turn—power stroking; when the piston of the expansion cylinder reach the exhaust vent of expansion cylinder, a portion of the gas inside the expansion cylinder is discharge out of the expansion cylinder through the exhaust vent of expansion cylinder, the remaining gas is retained inside the expansion cylinder for ready with the next stroking loop, at the same time, because the gas pressure inside the combustion chamber and expansion cylinder is reduced, the intake-exhaust valve of the combustion chamber is opened again. When the piston of the expansion cylinder move from the top most point to the lowest point—power stroking, the piston of compression cylinder driven by the connecting rod of the crankshaft, move from top most point to the lowest point, because the space inside the compression cylinder increase, the intake valve of the compression cylinder due to the vacuum effect opens again, air then enter into the compression cylinder through intake valve of compression cylinder for ready with the next stroking loop. In addition, when the pistons in the compression cylinder and expansion cylinder move from the top most point to the lowest point, the space inside the crankcase is reduced and the gas pressure is increased, the intake-exhaust valve of the crankcase is closed, and the exhaust valve of the crankcase is opened, the air inside the crankcase is discharged from crankcase through exhaust valve, and when the pistons in the expansion cylinder and compression cylinder have reached the lowest point, the second stroking loop is completed.

BRIEF DESCRIPTION OF THE DRAWING

FIG. 1 is structural view of an embodiment of a reciprocating piston gasoline engine.

DETAILED DESCRIPTION OF PREFERRED EMBODIMENT

A. Main components: cylinder head (32) of compression cylinder (14) comprises mainly of intake valve (1) and exhaust valve (2), wherein intake valve (1) and exhaust valve (12) mainly comprises of valve and spring; pistons (2) for compression cylinder (14) and a expansion cylinder (24), mainly comprises of seal ring groove, seal ring (6), piston pin, and piston pin seat, wherein the seal ring (6) is installed in the seal ring groove, and the piston pin is installed in the piston pin seat; connecting rod (3), mainly comprises of a small connecting rod header and a large connecting rod header; crankshaft (4), mainly comprises of a crankshaft main axle neck, connecting rod neck, and crankshaft arm; cylinder head (25) of expansion cylinder (24), mainly comprises of a expansion chamber (13), combustion chamber (10), valve (8), valve sleeve (29), valve returning spring (26), and intake-exhaust valve (31), wherein, the inside shape of the expansion chamber (13) and combustion chamber (10) is cylindrical and the expansion chamber (13) and combustion chamber (10) are interconnected with each other and are designed to situate on the same axis line, and the diameter of the mouth of the expansion chamber is larger than the diameter of the mouth of the combustion chamber (10); valve (8) mainly comprises of valve pole, seal ring groove for valve pole, seal ring (28) for valve pole, and valve nuts (27), wherein, the seal ring is installed in the seal ring groove, the valve pole is installed in the valve sleeve (29) of the cylinder head (25), the valve returning spring (26) is installed on the valve sleeve (29), valve nuts (27) is screwed in a screw head on the valve pole; wherein, valve (8) controls the opening and closing of the combustion chamber (10), on the side of the expansion chamber (13) a spray nozzle (7) is provided, on the side or top of the combustion chamber (10) spark plugs (9), a fuel nozzle (11), a primary intake passage (30) are provided; an intake-exhaust valve (31) mainly comprises of valve, spring, valve sleeve, nuts, wherein the spring is installed on the valve pole, valve pole is installed inside the valve sleeve, the valve sleeve is installed inside the opening of the valve by a supporting bracket, and the nuts are screwed in the screw head of valve pole; an engine body (16), mainly comprised of compression cylinder (14), an expansion cylinder (24), a crankcase (22), and a crankshaft main axle neck seat (21), wherein an exhaust vent (5) is provided under the expansion cylinder (24), a combustion chamber intake-exhaust valve (17), a crankcase exhaust valve (15), and an opening are provided on the crankcase (22); and a crankcase cover (19), mainly comprised of engine cover and crankshaft main axle neck seats (18), (20).

B. Engine components structural relationships: the pistons (2) are installed inside the compression cylinder (16) and expansion cylinder (24) of an engine body (16), the piston pin of the pistons (2) is connected with one end (small header) of a connecting rod (3), and the other end (larger header) of the connecting rod (3) is connected with the connecting rod neck of the crankshaft (4); the crankshaft cover (19) is screwed fixed with the crankcase (22) of the engine body (16); crankshaft (4) is installed in the crankshaft main axle neck seat (21) and crankshaft main axle neck seats (18), (20) of the crankcase cover (19); the cylinder head (25) of the expansion cylinder (24) is screwed fixed onto the expansion cylinder (24); the cylinder head (32) of the compression cylinder (14) is screwed fixed onto the compression cylinder (14); a pipeline (33) is provided to interconnect the intake-exhaust valve (31) of combustion chamber with the intake-exhaust valve (17) of the crankcase (22); and the exhaust vent (12) of the compression cylinder (14) is interconnected with the primary intake passage (30) of combustion chamber of the expansion cylinder; the pipeline (33) interconnects the intake-exhaust valve (31) of the combustion chamber with the intake-exhaust valve (17) of the crankcase (22); and the exhaust valve (12) of the compression cylinder (14) interconnects with the primary intake passage (30) of the combustion chamber of the expansion cylinder.

C. Stroking method: when the pistons (2) in compression cylinder (14) and expansion cylinder (24) are moving from the lowest point to the top most point in the compression cylinder (14) and expansion cylinder (24), the valve (8) of the combustion chamber (10) and the intake valve (1) of the compression cylinder (14) close due the gas pressure in the expansion cylinder (24) and compression cylinder (14). When the gas pressure in compression cylinder (14) is smaller than the spring pressure of exhaust valve (12), the gas will remain in the compression cylinder (14), and at the same time, the pistons (2) in the compression cylinder (14) and expansion cylinder (24) move upward, which increase the space inside the crankcase (22) that creates a vacuum suction that closes the exhaust valve (15) and opens the intake-exhaust valve (17) of the crankcase (22). During this time, the gas inside the combustion chamber (10) passes through the intake-exhaust valve (31) and pipeline (33) of the combustion chamber (10), while the gas also is sucked in through the intake-exhaust valve (17) of the crankcase (22) into the crankcase (22); at the same time, the air outside the engine body is also sucked through the intake-exhaust valve (17) of the crankcase (22) into the crankcase (22). When the gas pressure in the compression cylinder (14) is larger than the spring pressure of the exhaust vent (12) of the compression cylinder (14), the gas pressure opens up the exhaust vent (12). At this time, the gas inside the compression cylinder enters into the combustion chamber and because now the gas pressure in the combustion chamber (10) increases, the intake-exhaust valve (31) is closed. At this time, the gas inside the expansion cylinder (24) is compressed in the expansion chamber (13) of the expansion cylinder (24). When the pistons (2) in the compression cylinder (14) and the expansion cylinder (24) are moving close to the top most point, spray nozzle (7) with the effect of a low pressure water pump and a high pressure water pump sprays an appropriate amount of water into the expansion chamber (13) to allow quick cooling of the high temperature and high pressure air in the expansion chamber (13) and other components. At the same time, when the sprayed water meet with the high temperature and high pressure air in the expansion chamber (13), the water is quickly vaporized and expands, and at same time, fuel nozzle (11) with the effect of a low pressure fuel pump and a high pressure fuel pump, sprays an appropriate amount of fuel (gasoline, diesel fuel, natural gas) into the combustion chamber (10) that mixes with the air, and an ignition system triggers the spark plugs (9) to ignite the mixed combustible gas. The high temperature and high pressure air generated from burning mixed combustible gas pushes open the valve (8) of the combustion chamber (10), and expands the gas in the expansion chamber (13). When the pistons (2) in the expansion cylinder (24) and compression cylinder (14) have reached the top most point, the first stroking loop is completed. When the pistons (2) in the expansion cylinder (24) under the effect of high temperature and high pressure air, moves from the top most point to the lowest point, through the connecting rod (3), pistons (2) drive the crankshaft (4) to turn—or power stroking. When the pistons (2) in the expansion cylinder (24) have reached the exhaust vent (5) of the expansion cylinder (24), a portion of the gas in the expansion cylinder (24) is discharged from the expansion cylinder (24) through the exhaust vent (5), the remaining gas is retained in the expansion cylinder (24) for ready with the next stroking loop. At the same time, the gas pressure in the combustion chamber (10) and expansion cylinder (24) decreases, causing the intake-exhaust valve (31) of the combustion chamber (10) to open up. The pistons (2) in the expansion cylinder (24) moves from the top most point to the lowest point—or power stroking, the pistons (2) in the compression cylinder (14) driven by the connecting rod (3) and the crankshaft (4) begins to move from the top most point to the lowest point as well. Now the space inside the compression cylinder (14) increases, the vacuum suction effect opens up the intake valve (1) of the compression cylinder (14), this allows the air passes through the intake valve (1) into the compression cylinder (14) for ready with the next stroking loop. In addition, at the same time when pistons (2) in the compression cylinder (14) and expansion cylinder (24) are moving from the top most point to the lowest point, because the space inside the crankcase (22) decrease and the gas pressure increases, the intake-exhaust valve (17) of the crankcase (22) is closed and the valve (15) of the crankcase (22) is opened, the air inside the crankcase (22) is discharged through the exhaust valve (15), and when the pistons (2) of the expansion cylinder (24) and compression cylinder (14) have reached the lowest point, the second stroke loop is completed.

The invention claimed is:
1. A two-stroke reciprocating combustion piston engine comprising:
   a compression cylinder head comprising an intake and an exhaust valve;
   an expansion cylinder head comprising:
      an expansion chamber and a combustion chamber wherein an internal shape of the expansion chamber and of the combustion chamber is cylindrical and interconnected with each other along a same axis line, a diameter of a mouth of the expansion chamber being greater than a diameter of a mouth of the combustion chamber;
      a valve controlling opening/closing of the combustion chamber,
      an intake-exhaust valve, and
      a spray nozzle provided on a side of the expansion chamber;
   an engine body comprising:
      a compression cylinder,
      an expansion cylinder provided with an exhaust vent below the expansion cylinder, and
      a crankcase with a combustion chamber intake-exhaust valve and crankcase exhaust valve;
   pistons installed inside the compression cylinder and the expansion cylinder of the engine body,
   connecting rods, each comprising a small connecting rod header, a large connecting rod header, and a rod body,
   a crankshaft comprising a crankshaft main axle neck, a connecting rod axle neck, and a crankshaft arm; and
   a crankcase cover.

* * * * *